US012620535B2

(12) United States Patent
Mathae

(10) Patent No.: US 12,620,535 B2
(45) Date of Patent: May 5, 2026

(54) ELECTRICAL SWITCH FOR AN ON-LOAD TAP CHANGER

(71) Applicant: Hitachi Energy Ltd, Zürich (CH)

(72) Inventor: Jean Louis Gérard Mathae, Ludvika (SE)

(73) Assignee: Hitachi Energy Ltd, Zurich (CH)

( * ) Notice: Subject to any disclaimer, the term of this patent is extended or adjusted under 35 U.S.C. 154(b) by 0 days.

(21) Appl. No.: 19/104,897

(22) PCT Filed: Aug. 28, 2023

(86) PCT No.: PCT/EP2023/073539
§ 371 (c)(1),
(2) Date: Feb. 19, 2025

(87) PCT Pub. No.: WO2024/046985
PCT Pub. Date: Mar. 7, 2024

(65) Prior Publication Data

US 2025/0266216 A1 Aug. 21, 2025

(30) Foreign Application Priority Data

Aug. 29, 2022 (EP) .................................... 22192667

(51) Int. Cl.
*H01H 9/00* (2006.01)
*H01H 9/30* (2006.01)

(52) U.S. Cl.
CPC ........ *H01H 9/0027* (2013.01); *H01H 9/0016* (2013.01); *H01H 9/30* (2013.01)

(58) Field of Classification Search
CPC .. H01H 9/0027; H01H 9/0016; H01H 9/0005; H01H 9/0011; H01H 9/0033;
(Continued)

(56) References Cited

U.S. PATENT DOCUMENTS 3,720,867 A * 3/1973 Rathbun .............. H01H 9/0038 323/341
5,523,674 A * 6/1996 Dohnal ................ H01H 9/0038 323/341
(Continued)

FOREIGN PATENT DOCUMENTS

CN 109741979 A 5/2019
EP 1113548 A1 7/2001
(Continued)

OTHER PUBLICATIONS

International Search Report and Written Opinion of the International Searching Authority, PCT/EP2023/073539, mailed Oct. 24, 2023, 12 pages.
(Continued)

*Primary Examiner* — William A Bolton
(74) *Attorney, Agent, or Firm* — Sage Patent Group

(57) ABSTRACT

An electrical switch for an on-load tap changer, said electrical switch comprising: at least three electrical contacts connected to a respective electrical conductor, a switch means configured to be movable between a plurality of positions, the switch means in each respective position physically contacting a respective combination of said electrical contacts to provide electrical contact between the electrical contacts in each respective combination of electrical contacts, the switch means including two electrically interconnected contacts or contact surfaces provided on a movable carrier element mounted on the operating member for movement along a said arcuate path, and the contacts or contact surfaces being provided at a same radial distance from the rotational axis and with a same spacing as the electrical contacts of each respective combination of electrical contacts.

11 Claims, 3 Drawing Sheets

(58) Field of Classification Search
CPC .. H01H 9/0044; H01H 9/0038; H01H 9/0072; H01H 9/30; H01H 9/00; H01F 27/04; H01F 29/04; H02B 5/00
USPC .............................. 200/11 TC, 293; 174/17 R
See application file for complete search history.

(56) References Cited

U.S. PATENT DOCUMENTS 6,060,669 A * 5/2000 Dohnal ................ H01H 9/0033 200/11 TC
9,401,249 B2 * 7/2016 Elick .................... H01H 9/0044
10,147,563 B2 * 12/2018 Kaltenborn ............. H01F 29/02
10,460,884 B2 * 10/2019 Pankofer ................. H01F 29/04
11,177,086 B2 * 11/2021 Stocker ................ H01H 9/0033
11,750,092 B2 * 9/2023 Pfeilschifter ........... H02M 3/04 320/109
2015/0179362 A1 * 6/2015 Hammer ................. H01F 29/04 200/11 TC
2016/0033980 A1 2/2016 Carlen et al.
2019/0288503 A1 * 9/2019 Stenestam ............... H01F 29/02

FOREIGN PATENT DOCUMENTS

EP 1113549 A1 7/2001
EP 2980820 A1 2/2016
GB 2000911 A 1/1979
JP H0677064 A 3/1994

OTHER PUBLICATIONS

International Preliminary Report on Patentability, PCT/EP2023/073539, mailed Feb. 15, 2024, 24 pages.
First Office Action, Chinese Patent Application No. 202380062997, mailed Nov. 5, 2025, 7 pages.

* cited by examiner

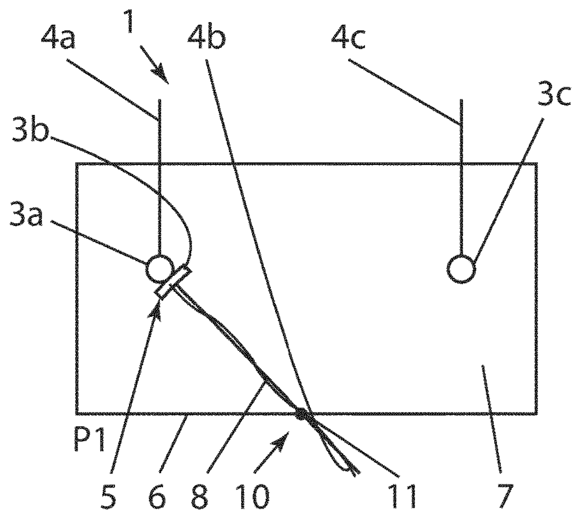
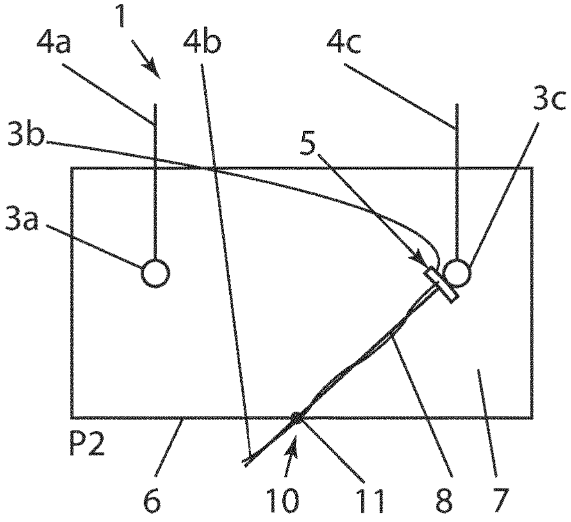
Fig. 4a
Fig. 4b
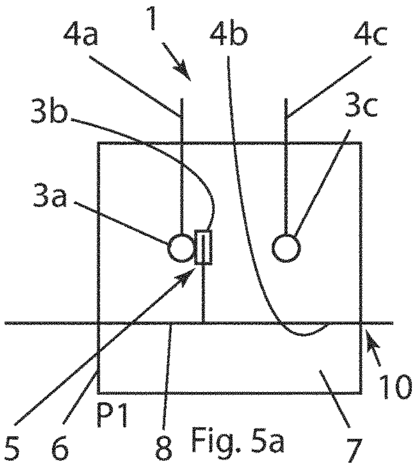
Fig. 5a
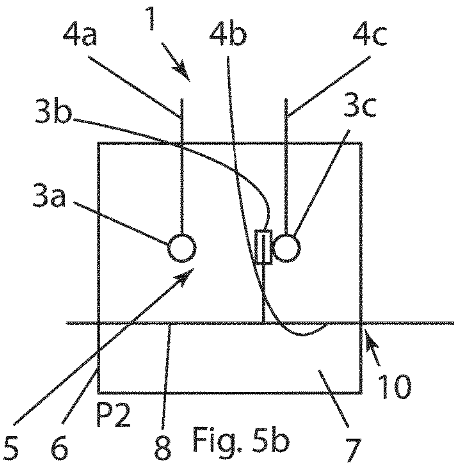
Fig. 5b

ELECTRICAL SWITCH FOR AN ON-LOAD TAP CHANGER

CROSS REFERENCE TO RELATED APPLICATIONS

This application is a 35 U.S.C. § 371 national stage application of PCT International Application No. PCT/EP2023/073539 filed on Aug. 28, 2023, which in turn claims foreign priority to European Patent Application No. 22192667.8, filed on Aug. 29, 2022, the disclosures and content of which are incorporated by reference herein in their entirety.

TECHNICAL FIELD

The present disclosure relates to on-load tap changers and more specifically to an electrical switch for an on-load tap changer.

BACKGROUND

Electrical switches are often used in on-load tap changers (OLTC) for different functions, such as a main switch, a resistor switch, a pre-selector switch or a diverter switch. The specific design of the switches may vary; For example, some switches are designed to 'make before break' whilst some are designed to 'break before make'. The on-load tap changers are often used with voltages at which the electrical switch is subject to arcing upon change of position of the electrical switch. Arcing causes wear of the electrical switch, and thus contamination of surrounding components of the OLTC and/or contamination of the electrical switch. For example, an insulating oil in the OLTC may become contaminated and lose parts of its insulating properties.

SUMMARY

Accordingly, an object of the present disclosure is to increase lifetime and reduce service need of an on-load tap changer.

According to a first aspect of the present disclosure, this and other objects is achieved by an electrical switch according to claim 1, with alternative embodiments set forth in the dependent claims. The electrical switch is for an on-load tap changer and the electrical switch comprises at least three electrical contacts connected to a respective electrical conductor. The electrical switch further comprises a switch means configured to be movable between a plurality of positions, wherein the switch means in each respective position physically contacts a respective combination of said electrical contacts to provide electrical contact between the electrical contacts in each respective combination of electrical contacts. The physical contact governed by the switch means may either be a direct contact between contacts of each combination of contacts, or the physical contact may be provided by a portion of the switch means contacting the contacts of each combination of contacts to bridge between the combination of contacts. The electrical switch further comprises a hermetically sealed housing providing an inner space enclosing the electrical contacts and the switch means. The electrical conductors extending from the electrical contacts inside the inner space of the housing to an outside of the housing. The electrical switch further comprises a control means configured to control movement of the switch means. Also, the inner space is under vacuum or is filled with an arc suppression gas.

The control means comprises an operating member extending from the outside of the housing into the inner space of the housing. The operating member is operatively connected to the switch means such that the operating member is able to move the switch means to the plurality of positions depending on a position of the operating member.

The operating member comprises an arm rotatably attached to the housing for rotation about a rotational axis. The switch means is attached an end portion of the arm such that the switch means is movable between said plurality of positions along an arcuate path. The switch means comprises two electrically interconnected contacts or contact surfaces provided on a movable carrier element mounted on the operating member for movement along a said arcuate path, and the contacts or contact surfaces of the switch means are provided at a same radial distance from the rotational axis and with a same spacing as the electrical contacts of each respective combination of electrical contacts.

For example, the electrical switch may be connected to a plurality of tap selector switches and to a neutral terminal/load via respective ones of said conductors. The movable switch means is operated between different positions to connect the load to different ones of the plurality of tap selector switches. This enables a current to be routed through a first tap selector switch whilst another tap selector switch is adjusted, wherein the electrical switch is subsequently operated to electrically connect the other tap selector switch and disconnect the first tap selector switch. By providing a hermetically sealed housing around the electrical contacts and the switch means and providing a vacuum or an arc suppression gas inside the housing, the electrical contacts and the switch means will be subjected to less arcing upon operation of the electrical switch. Since the conductors are routed from the inside of the housing to the outside of the housing, the conductors are still accessible from outside the housing, where some other suitable environment can be provided, such as air or an electrically insulating oil. The ends of the conductors accessible outside the housing may thus be connected to the load and to the plurality of tap selector switches. The provision of a housing specifically for the electrical switch contains any contaminants produced as the electrical switch is operated due to mechanical wear and arcing acting on the electrical contacts and the switch means. By containing the contaminants inside the housing of the electrical switch, an improved lifetime of other components of the on-load tap changer is enabled. A worn-out electrical switch can easily be replaced.

The inner space may be filled with an SF6 arc suppression gas. SF6 gas is a suitable arc suppression gas and reduces arcing.

The switch means may be configured to be movable to a first position in which the switch means physically contacts a first one of said electrical contacts and a second one of said electrical contacts, and to be movable to a second position in which the switch means physically contacts said second one of said electrical contacts and a third one of said electrical contacts.

A second aspect of the present disclosure relates to an on-load tap changer comprising an electrical switch according to any one of claims 1-5, as described above.

The electrical switch of the on-load tap changer may be a diverter switch, wherein one of said conductors is a neutral conductor, and wherein remaining conductors are connected to a respective tap selector switch of the on-load tap changer.

1 shows an on-load tap changer provided with an electrical switch in the form of a diverter switch.

Figure 2A:
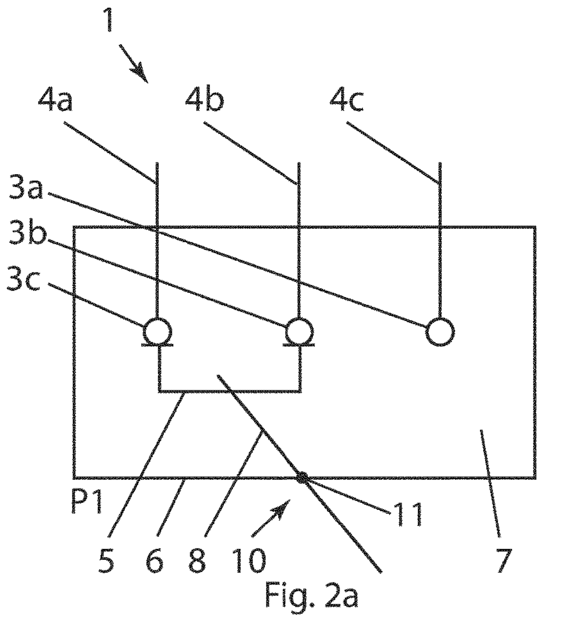
Figure 2B:
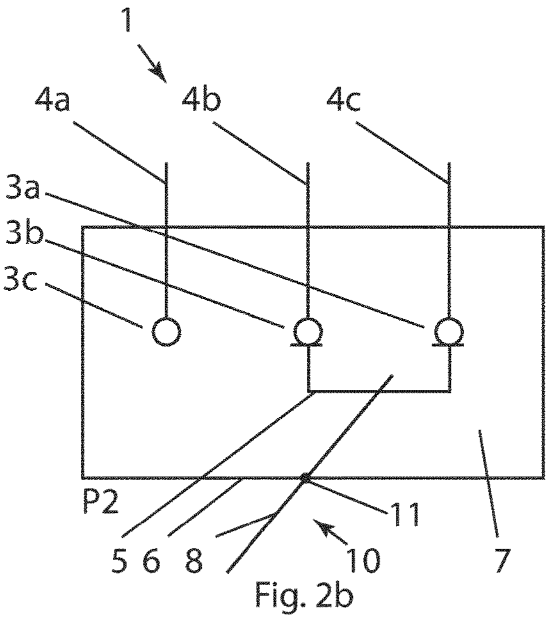

FIGS. 2*a* and 2*b* schematically show a first embodiment of an electrical switch featuring a switch means with a straight movement between two operative positions. FIG. 2*a* shows the electrical switch in a first position and FIG. 2*b* shows the electrical switch in a second position.

Figure 3A:
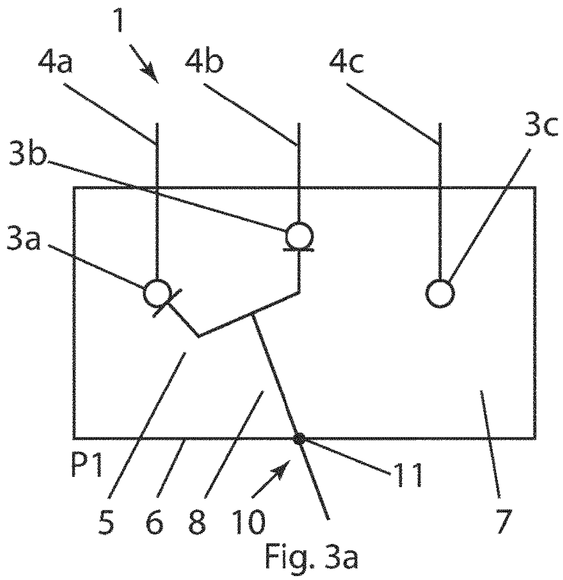
Figure 3B:
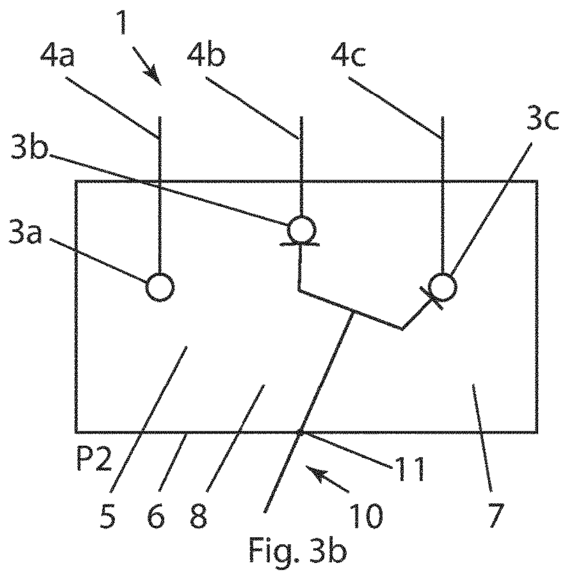

FIGS. 3*a* and 3*b* schematically show a second embodiment of an electrical switch featuring a switch means with an arcuate movement between two operative positions. FIG. 3*a* shows the electrical switch in a first position and FIG. 3*b* shows the electrical switch in a second position.

FIGS. 4*a* and 4*b* schematically show a third embodiment of an electrical switch featuring a switch means comprising one of the electrical contacts. The switch means is movable in an arcuate movement between two operative positions. FIG. 4*a* shows the electrical switch in a first position and FIG. 4*b* shows the electrical switch in a second position.

FIGS. 5*a* and 5*b* schematically show a fourth embodiment of an electrical switch featuring a switch means comprising one of the electrical contacts. The switch means is movable along a straight path between two operative positions. FIG. 5*a* shows the electrical switch in a first position and FIG. 5*b* shows the electrical switch in a second position.

DETAILED DESCRIPTION

With reference to the appended drawings, a more detailed description of embodiments of the present disclosure follows below.

As mentioned above, an object of the present disclosure is to increase lifetime and reduce service need of an on-load tap changer.

According to the present disclosure, this object is achieved by provision of a new design of an electrical switch 1, using a hermetically sealed housing 6 to contain only the inner components of the electrical switch 1 where arcing is a challenge. Hence, electrical conductors of the electrical switch 1 are routed to the outside of the housing 6 for connection to various electrical conductors of the device in which the electrical switch 1 is used.

The electrical switch 1 can find many uses in an on-load tap changer 2. For example, the electrical switch 1 may be used as a main switch, a resistor switch, a pre-selector switch or a diverter switch. An exemplary embodiment below showcases the use of the electric switch as a diverter switch of an on-load tap changer 2. However, the interior of the electrical switch 1, such as the number of electrical contacts 3*a*, 3*b*, 3*c*, the number of electrical conductors and the provision of additional electrical components or alternative control means 10 for controlling switching of the electrical switch 1, may alternatively be used without departing from the embodiments of the present disclosure which rather relates to provision of the hermetically sealed housing 6 containing vacuum or an arc suppression gas.

Figure 1:
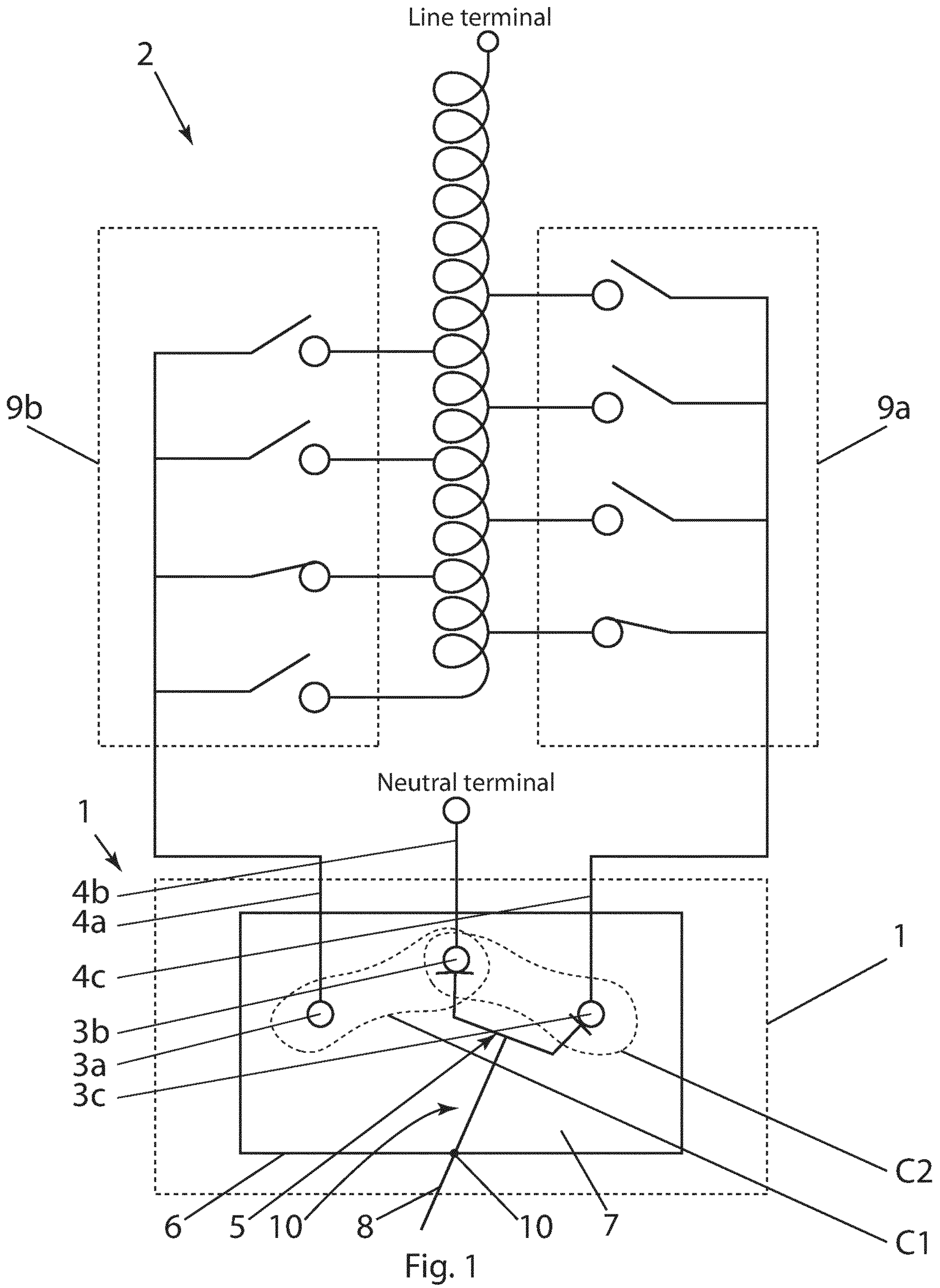
FIG. 1 schematically shows an exemplary use case for an electrical switch of the present disclosure; Specifically, FIG.

FIGS. 1, 3*a*, and 3*b* schematically show a first embodiment of an electrical switch 1 according to the present disclosure. As shown in FIG. 1. the electrical switch 1 may be used in an on-load tap changer 2. The electrical switch 1 comprises three electrical contacts 3*a*, 3*b*, 3*c* connected to a respective electrical conductor 4*a*, 4*b*, 4*c*. The electric switch 1 also comprises a switch means 5 configured to be movable between a plurality of positions P1, P2, wherein the switch means 5 in each respective position P1, P2 physically contacts a respective combination C1, C2 of said electrical contacts 3*a*, 3*b*, 3*c* to provide electrical contact between the electrical contacts in each respective combination C1, C2 of electrical contacts 3*a*, 3*b*, 3*c*. In other embodiments, a higher number of electrical contacts and electrical conductors may alternatively be provided instead, depending on the desired use and functionality of the electrical switch 1. For example, the design for a making-before-breaking type of electrical switches is somewhat different from the breaking-before-making type of electrical switch schematically disclosed in the first embodiment.

The electrical switch 1 further comprises a hermetically sealed housing 6 providing an inner space 7 enclosing the contacts 3*a*, 3*b*, 3*c* and the switch means 5. The electrical conductors 4*a*, 4*b*, 4*c* extend from the contacts 3*a*, 3*b*, 3*c* inside the inner space 7 of the housing 6 to an outside of the housing 6. Hence, the housing 6 is a relatively small housing containing only components of the electrical switch 1, and thus should not be confused with any surrounding housing enclosing also other components, such as a surrounding transformer tank or similar. This is made clear in the appended claims by specifying that the electrical conductors 4*a*, 4*b*, 4*c* of the electrical switch 1 extend from an inside of the housing 6 to an outside of the housing 6.

The electrical switch 1 also comprises a control means 10 configured to control movement of the switch means 5. Further, the inner space 7 of the housing 6 is under vacuum or is filled with an arc suppression gas, such as SF6.

As shown in FIG. 1, a first electrical conductor of electrical switch 1 is connected to a plurality of tap selector switches 9*a*, 9*b* and to a load via respective ones of said electrical conductors. The movable switch means 5 is operated between different positions to connect the load to different ones of the plurality of tap selector switches 9*a*, 9*b*. This enables a current to be routed through a first tap selector switch 9*a* whilst a second tap selector switch 9*b* is switched/operated to another position, wherein the electrical switch 1 is subsequently operated to electrically connect the second tap selector switch 9*b* and disconnect the first tap selector switch 9*a*. By providing a hermetically sealed housing 6 around the electrical contacts 3*a*, 3*b*, 3*c* and the switch means 5 and providing a vacuum or an arc suppression gas inside the housing, the electrical contacts 3*a*, 3*b*, 3*c* and the switch means 5 will be subjected to less arcing upon operation of the electrical switch 1. Since the electrical conductors are routed from the inside of the housing to the outside of the housing, the electrical conductors are still accessible from outside the housing, where some other suitable environment can be provided, such as air or an electrically insulating oil. The ends of the electrical conductors accessible outside the housing may thus be connected to the load and to the plurality of tap selector switches 9*a*, 9*b*. The provision of a housing specifically for the electrical switch 1 contains any contaminants produced as the electrical switch 1 is operated due to mechanical wear and arcing acting on the contacts 3*a*, 3*b*, 3*c* and the switch means 5. By containing the contaminants inside the housing of the electrical switch 1, an improved lifetime of other components of the on-load tap changer 2 is enabled. A worn-out electrical switch 1 can easily be replaced.

The control means 10 comprises an operating member 8 extending from the outside of the housing 6 into the inner space 7 of the housing 6. The operating member 8 is operatively connected to the switch means 5 such that the operating member 8 is able to move the switch means 5 to the plurality of positions P1, P2 depending on a position of the operating member 8. In this embodiment, the operating member 8 comprises an arm 9 rotatably attached to the housing 6 for rotation about a rotational axis 11. The switch means 5 is attached an end portion of the arm such that the switch means 5 is movable between said plurality of positions along an arcuate path. In other embodiments, a mechanical linkage or transmission may be provided instead of the arm 8.

Alternatively, an actuator may be provided within the inner space 7 of the housing 6, said actuator being operatively connected to an internal operating member 8 not extending outside the housing 6, wherein the actuator is electrically powered by a cable extending from the inner space 7 of the housing 6 to the outside of the housing 6.

The switch means 5 comprises two electrically interconnected contacts or contact surfaces provided on a movable carrier element mounted on the operating member for movement along a said arcuate path, and said contacts or contact surfaces of the switch means 5 are with a same spacing as the electrical contacts of each respective combination C1, C2 of electrical contacts.

In this embodiment, the arm 9 is controlled by an actuator (not shown) but could in other embodiments, be manually operated. As shown in FIGS. 2*a* and 2*b*, the movement path of the switch means 5 may alternatively be straight, or have any other suitable extent, however requiring suitable adaptation of the control means 10.

As shown in FIGS. 4*a*-*b* and FIGS. 5*a*-*b*. the switch means 5 may comprise one 3*b* of the electrical contacts. The switch means 5 is movable in an arcuate movement between two operative positions P1, P2. FIGS. 4*a* and 5*a* show the electrical switch 1 in a first operative position P1 and FIGS. 4*b* and 5*b* show the electrical switch in a second operative position P2.

In the embodiment of FIGS. 4*a*-*b*, the second conductor 4*b* is a conductor provided separately from the control means 10, but in other embodiments, such as the one of FIGS. 5*a*-*b*, the control means 10 may be electrically conductive and thus function as the second conductor 4*b*.

The switch means 5 is thus configured to be movable to a first position P1 in which the switch means 5 physically contacts a first one 3*a* of said electrical contacts 3*a*, 3*b*, 3*c* and a second one 3*b* of said electrical contacts 3*a*, 3*b*, 3*c*, and to be movable to a second position P2 in which the switch means 5 physically contacts said second one 3*b* of said electrical contacts 3*a*, 3*b*, 3*c* and a third one 3*c* of said electrical contacts 3*a*, 3*b*, 3*c*. As shown in FIG. 1, one 4*b* of said electrical conductors 4*a*, 4*b*, 4*c* is a neutral conductor, and the remaining two connectors 4*a*, 4*c* are connected to a respective tap selector switch 9*a*, 9*b*.

In other embodiments, further positions may be provided for, such as an intermediate position where current flows via other electrical contacts to provide for a making-before-breaking functionality.

Accordingly, the present disclosure thus also proposes to provide an on-load tap changer 2 with the above discussed electrical switch 1, as shown in FIG. 1.

| Table of reference numerals | |
|---|---|
| 1 | electrical switch |
| 2 | on-load tap changer |
| 3a, 3b, 3c | electrical contacts |
| 4a, 4b, 4c | electrical conductors |
| 5 | switch means |
| 6 | (hermetically sealed) housing |
| 7 | inner space |
| 8 | operating member |
| 9a, 9b | tap selector switches |
| 10 | control means |
| 11 | rotational axis |

The invention claimed is:

1. An electrical switch for an on-load tap changer, said electrical switch comprising:

at least three electrical contacts connected to respective electrical conductors, a movable switch assembly configured to be movable between a plurality of positions, said movable switch assembly comprising two electrically interconnected contacts or contact surfaces provided on a carrier element, such that in each respective position the movable switch assembly physically contacts a respective combination of said electrical contacts to provide electrical contact between the electrical contacts in each respective combination;

a hermetically sealed housing providing an inner space enclosing the electrical contacts and the movable switch assembly, said electrical conductors extending from the electrical contacts inside the inner space of the housing to an outside of the housing, and a control assembly comprising an operating member extending from the outside of the housing into the inner space of the housing, the operating member being operatively connected to the movable switch assembly such that the operating member is able to move the movable switch assembly to the plurality of positions depending on a position of the operating member, wherein said inner space is under vacuum or is filled with an arc suppression gas, wherein the operating member comprises an arm rotatably attached to the housing for rotation about a rotational axis, wherein the movable switch assembly is attached to an end portion of the arm such that the movable switch assembly is movable between said plurality of positions along an arcuate path, wherein said contacts or contact surfaces of the movable switch assembly are provided at a same radial distance from the rotational axis and with a same spacing as the electrical contacts of each respective combination of electrical contacts.

2. The electrical switch according to claim 1, wherein said inner space is filled with an SF6 arc suppression gas.

3. The electrical switch according to claim 1, wherein the movable switch assembly is configured to be movable to a first position in which the movable switch assembly physically contacts a first one of said electrical contacts and a second one of said electrical contacts, and to be movable to a second position in which the movable switch assembly physically contacts said second one of said electrical contacts and a third one of said electrical contacts.

4. An on-load tap changer comprising the electrical switch according to claim 1.

5. The on-load tap changer according to claim 4, wherein the electrical switch is a diverter switch, wherein one of said electrical conductors is a neutral conductor, and wherein remaining conductors are connected to respective tap selector switches.

6. The electrical switch according to claim 1, wherein the carrier element of the movable switch assembly is mounted at an end portion of the operating member.

7. The electrical switch according to claim 1, wherein the movable switch assembly comprises one of said electrical contacts.

8. The electrical switch according to claim 1, wherein the control assembly is actuated by a motorized actuator.

9. The electrical switch according to claim 1, wherein the actuator is located outside the housing and drives the operating member through a sealed interface.

10. The electrical switch according to claim 1, wherein the movable switch assembly is movable to an intermediate position in which current flows via additional electrical contacts.

11. The electrical switch according to claim 1, wherein one of said electrical conductors is a neutral conductor, and the remaining electrical conductors are connected to respective tap selector switches.

* * * * *